United States Patent [19]
Yoshino et al.

[11] Patent Number: 4,594,573
[45] Date of Patent: Jun. 10, 1986

[54] REVERBERATION SOUND GENERATOR

[75] Inventors: Muneki Yoshino, Aichi; Toshitaka Tanahashi, Okazaki, both of Japan

[73] Assignee: Nippondenso Co., Ltd., Kariya, Japan

[21] Appl. No.: 459,199

[22] Filed: Jan. 19, 1983

[51] Int. Cl.$^4$ .............................................. B60Q 1/00
[52] U.S. Cl. ..................................... 340/62; 307/321; 331/139; 340/384 E
[58] Field of Search .............. 340/62, 384 E; 331/139; 307/321, 257, 259

[56] References Cited
U.S. PATENT DOCUMENTS 3,859,629  1/1975  Komiyama et al. .................. 340/62
4,139,842  2/1979  Fujita et al. ...................... 340/384 E Primary Examiner—John W. Caldwell, Sr.
Assistant Examiner—Michael F. Heim
Attorney, Agent, or Firm—Cushman, Darby & Cushman

[57] ABSTRACT

A reverberation sound generator is provided for use as a warning generator for giving a warning to the driver of an automobile, for example. The reverberation sound generator has a capacitor connected in series with a power supply, a pair of diodes and a pair of resistors connected in series with the capacitor, and a sound generator circuit connected between the pair of diodes and the pair of resistors. A sound generation command switch is joined in series with the diodes and resistors. There is a circuit for discharging the capacitor. The capacitor can be controlled in its charging and discharging in response to closing and opening of the sound generation switch. When the capacitor is charged and discharged, the sound generator circuit produces reverberation sounds, respectively.

5 Claims, 2 Drawing Figures

REVERBERATION SOUND GENERATOR

BACKGROUND OF THE INVENTION (1.) Field of the Invention

The present invention relates to a reverberation sound generator for use as a warning generator for giving a warning to the driver of an automobile, for example, or particularly as a speed warning generator which can be actuated when the car speed exceeds a preset value.

(2.) Description of the Prior Art

Speed warning generators to which the present invention is directed give a warning to the driver of a car when the car speed becomes higher than a predetermined speed, such as 100 Km/hour. The speed alarm generator utilizes contacts in a speedometer and is energizable when the car speed as indicated by the speedometer exceeds a preset warning speed. The warning means in such a speed warning generator is generally required to meet the following requirements: First, it should be constructed simply and inexpensively. Second, A sound pressure great enough to transmit a warning reliably to the driver should be ensured. The third requirement is that the warning means should be of high safety for issuing a warning sound with a good tone color so as not to disturb the driver's activities while driving the car.

To satisfy the foregoing requirements, conventional warning generators are ganged with a speedometer for detecting a car speed higher than 100 Km/hour, for example, to turn intermittently on and off the contacts for producing a warning while the car speed is exceeding the preset level. The speed warning generator incorporates a mechanical chime mechanism including a plunger mechanism energizable when the contacts are closed for striking a first vibrator plate and a spring mechanism attached to the plunger mechanism and actuatable when the contacts are opened to produce a reactive force for hitting a second vibrator plate. Thus, the prior speed warning generator has employed a chime mechanism as the warning means for producing intermittent sounds. Such a mechanical chime is simple and inexpensive in construction, can produce a warning sound of sufficiently good tone color, and hence is used effectively.

However, the mechanical chime has failed to produce sounds of a sufficient sound pressure. It has been disadvantageous in that it is subjected to limitations on the location of its installation, its orientation, and the like. One way to eliminate the above difficulties with the chime mechanism would be to provide means for increasing the sound pressure, and such means would be larger vibrator plates and increase the attractive force of the plunger mechanism with which to hit the vibrator plates, that is, increase the ampere turn of the coil of the plunger. This proposal however would be limited by its size and power comsumption. Another means for overcoming the insufficient sound pressure in the mechanical chime would be to use an electromagnetic buzzer. The electromagnetic buzzer with contacts however would be unstable in tone color because of rattles due to vibrations of the car, sound changes, and other causes. Contactless buzzers would generally emit sounds of high fundamentals since the diameter of a vibrator plate could not be increased due to the size limitation. Although the contactless buzzer would be able to ensure a sufficient sound pressure, it would give the driver discomfort and hence tend to interfere with the driver's driving activities.

SUMMARY OF THE INVENTION

With the foregoing problems in view, it is an object of the present invention to provide a reverberation sound generator for producing comfortable and pleasing warning sounds of sufficient sound pressure which are gradually attenuated when a sound generation command switch is closed and opened intermittently at a preset frequency.

Another object of the present invention is to provide a reverberation sound generator that can be used effectively as a general warning device, for example.

According to the present invention, a reverberation sound generator comprises a bridge circuit composed of a pair of reversed diodes and a pair of resistors, a sound generator circuit connected to the bridge circuit, a capacitor connected to the bridge circuit and a DC power supply, and a sound generation command switch coupled to the bridge circuit. When the sound generation command switch is closed and opened, the capacitor is charged and discharged, respectively, to cause a decreasing current to flow through one of the diodes at a time for energizing the sound generator circuit to emit reverberation sounds.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
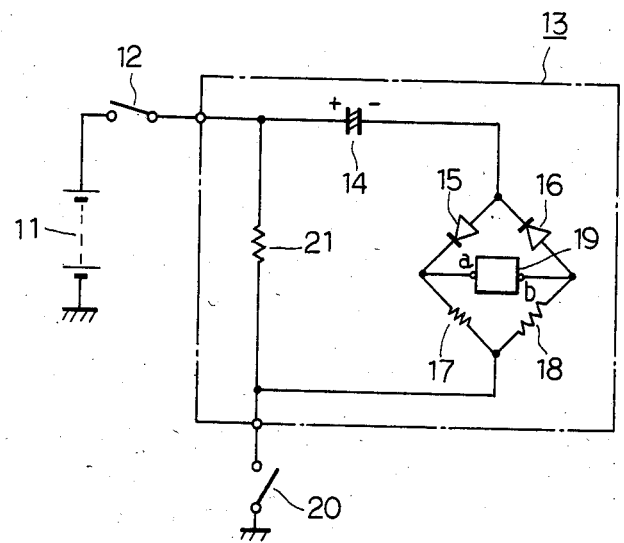
FIG. 1 is a circuit diagram of a reverberation sound generator according to the present invention.

The present invention will now be described, as being incorporated in an automobile speed warning generator, with reference to the drawings. In FIG. 1, a DC power supply 11 such as a storage battery on an automobile supplies an electric power via an ignition switch 12 to a reverberation sound generator 13. The reverberation sound generator 13 has a capacitor 14 chargeable by a current supplied from the DC power supply 11 through the ignition switch 12. To the capacitor 14 are connected a pair of diodes 15, 16 which are coupled together through a pair of resistors 17, 18, respectively. Therefore, the diodes 15, 16 and the resistors 17, 18 jointly constitute a bridge circuit. The diodes 15, 16 and the resistors 17, 18 are coupled at junctions a, b, respectively, between which a sound generator circuit 19 is connected.

The capacitor 14 and the bridge circuit to which the sound generator circuit 19 is connected are joined in series with each other. The diodes 15, 16 are connected in opposite polarity to each other such that they will be forward-biased respectively by charging and discharging currents for the capacitor 14.

The bridge circuit is grounded via a switch for commanding sound generation. The switch is controlled to open and close its contacts at a predetermined frequency such as 1 Hz in response to an electric signal issued from a speed sensor mechanism (not shown) in response to detection thereby of a car speed of 100 Km/hour, for example, or higher. A discharge resistor 21 is connected in parallel to the series connection of the capacitor 14 and the bridge circuit.

Figure 2:
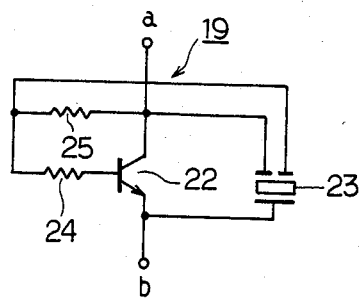
FIG. 2 is a circuit diagram of a sound generator circuit in the reverberation sound generator shown in FIG. 1.

FIG. 2 shows in detail the sound generator circuit 19 connected between the junctions a, b of the bridge circuit. The sound generator circuit 19 comprises a driver transistor 22 of the NPN type having a collector and an emitter connected respectively to the junctions a, b. A piezoelectric element 23 has a feedback terminal that can be driven by the transistor 22. A resistor 24 is connected to the base of the transistor 22. A self-biasing resistor 25 is connected between the resistor 24 and the collector of the transistor 22. The sound generator circuit 19 thus constitutes a self-excited piezoelectric buzzer. The sound generator circuit 19 itself is a well known self-excited type audio transducer, for instance, as described in FIG. 1 of laid-open Japanese Patent Application No. 54-136194 which was published Oct. 23, 1979.

The reverberation sound generator of the foregoing construction will operate as follows: When the car speed exceeds a preset speed level, the switch 20 turns on and off repeatedly in response to an electric signal issued by the speed sensor mechanism shown in FIG. 1. With the switch 20 closed, a current path is completed from the power supply 11 through the ignition switch 12 which is closed while the car is running, the capacitor 14, the diode 15, the sound generator circuit 19, the resistor 18, and the switch 20 to gound. A divided current also flows through the resistor 17. Therefore, the capacitor 14 is progressively charged dependent on its electrostatic capacity and a time constant determined by the resistances of the resistors 17, 18, and the impedance of the sound generator circuit 19. Stated otherwise, the voltage applied between the junctions a, b across the sound generator circuit 19 is gradually reduced after the switch 20 has been closed, causing the piezoelectric element 23 serving as a sound generator to produce a decreasing sound, or a sound with reverberation. When the capacitor 14 is completely charged, no more DC voltage is applied, and the sound generator circuit 19 stops producing sounds.

When the switch 20 is then opened, the capacitor 14 starts being discharged through the resistors 21, 17, the sound generator circuit 19, and the diode 16, and through the resistors 21, 18, and the diode 16. The discharging of the capacitor 14 is dependent on a time constant determined by the resistors 21, 17, 18 and the impedance of the sound generator circuit 19. The voltage between the junctions a, b is gradually reduced to allow the sound generator circuit 19 to produce a sound with reverberation.

Accordingly, two distinct reverberation sounds are produced when the switch 20 is closed and opened in one cycle. Intermittent closing and opening of the switch 20 at a frequency of 1 Hz, for example, causes the sound generator circuit 19 to produce warning sounds of desired good tone color.

Since the discharging current from the capacitor 14 flows through the resistor 21, it is smaller as compared with the charging current, rendering the reverberation sound pressures different from each other when the switch 20 is closed and opened. The reverberation sounds repeatedly produced have a clear accent in each cycle, so that the overall warning sound is effective and comfortable.

With the arrangement of the present invention, the reverberation sound generator is simple in construction since reverberation sounds can be produced when a capacitor is charged and discharged in response to closing and opening of a switch. A warning sound thus produced by the reveration sound generator is quite pleasing to the ear. Since the sound generator circuit has a piezoelectric element drivable by self excitation, it can ensure a required amount of sound pressure. The reverberation sound generator is therefore highly effective for use as a speed warning generator for automotibles, for example.

Although a certain preferred embodiment has been shown and described, it should be understood that many changes and modifications may be made therein without departing from the scope of the appended claims.

What is claimed is:

1. A reverberation sound generator comprising:
a power supply;
a capacitor connected to said power supply;
a pair of first and second diodes and a pair of first and second resistors which are connected in series to said capacitor, said diodes being connected in parallel to each other in opposite polarity, said resistors being connected in parallel to each other;
a sound generator circuit having terminals connected between said first diode and resistor and between said second diode and resistor, respectively, said sound generator circuit being energizable to produce a sound responsive to the difference between potentials at said terminals;
a sound generation command switch connected in series with said first and second diodes and resistors, said capacitor being chargeable in response to closing of said sound generation command switch; and
a discharging circuit connected between a junction between said sound generation command switch and said first and second diodes and resistors and another junction between said power supply and said capacitor.

2. A reverberation sound generator according to claim 1, wherein said discharging circuit includes a resistor.

3. A reverberation sound generator according to claim 1 or 2, wherein said sound generator circuit includes a driver transistor of the NPN type and a piezoelectric element having a feedback terminal drivable by said transistor.

4. A reverberation sound generator according to claim 1 or 2, wherein said sound generation command switch is controlled to be opened and closed intermittently at a predetermined frequency.

5. A reverberation sound generator according to claim 4, in association with an automobile, wherein said sound generation command switch is actuatable when the speed of the automobile exceeds a preset speed.

* * * * *